US010728827B2

United States Patent
Xiao et al.

(10) Patent No.: US 10,728,827 B2
(45) Date of Patent: Jul. 28, 2020

(54) SERVICE MESSAGE SENDING METHOD, TERMINAL DEVICE, AND NETWORK DEVICE

(71) Applicant: HUAWEI TECHNOLOGIES CO., LTD., Shenzhen, Guangdong (CN)

(72) Inventors: Xiao Xiao, Beijing (CN); Mingchao Li, Beijing (CN); Zhenzhen Cao, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/195,611

(22) Filed: Nov. 19, 2018

(65) Prior Publication Data

US 2019/0090173 A1 Mar. 21, 2019

Related U.S. Application Data

(63) Continuation of application No. PCT/CN2016/082854, filed on May 20, 2016.

(51) Int. Cl.
*H04W 40/12* (2009.01)
*H04W 4/40* (2018.01)
(Continued)

(52) U.S. Cl.
CPC .............. *H04W 40/12* (2013.01); *H04W 4/40* (2018.02); *H04W 4/46* (2018.02); *H04W 40/02* (2013.01); *H04W 92/10* (2013.01); *H04W 92/18* (2013.01)

(58) Field of Classification Search
CPC ......... H04W 40/12; H04W 4/46; H04W 4/40; H04W 40/02
See application file for complete search history.

(56) References Cited

U.S. PATENT DOCUMENTS

2014/0016570 A1* 1/2014 Ma .................... H04W 72/02
2015/0009864 A1 1/2015 Kim et al.
2018/0376308 A1* 12/2018 Xiao ..................... H04W 4/46

FOREIGN PATENT DOCUMENTS

CN 105246025 A 1/2016
CN 105430621 A 3/2016
(Continued)

OTHER PUBLICATIONS

3GPP TR 22.885 V14.0.0 (Dec. 2015);3rd Generation Partnership Project;Technical Specification Group Services and System Aspects;Study on LTE support for Vehicle to Everything (V2X) services(Release 14),total 50 pages.

(Continued)

*Primary Examiner* — Ronald B Abelson
(74) *Attorney, Agent, or Firm* — Womble Bond Dickinson (US) LLP

(57) ABSTRACT

Embodiments of the present disclosure provide a V2X service message sending method, a terminal device, and a network-side device. The V2X service message sending method includes: receiving communications interface configuration information from a network-side device, where the communications interface configuration information includes interface indication information used to indicate at least one communications interface used to send a V2X service message; determining, based on the communications interface configuration information, one communications interface from at least two communications interfaces used to send V2X; and sending the V2X service message through the determined one communications interface. In this way, transmission performance of a V2X service message can be improved.

20 Claims, 6 Drawing Sheets

(51) Int. Cl.
  *H04W 4/46*   (2018.01)
  *H04W 40/02*  (2009.01)
  *H04W 92/10*  (2009.01)
  *H04W 92/18*  (2009.01)

(56) References Cited

FOREIGN PATENT DOCUMENTS

CN    105554689 A    5/2016
EP       3410663 A1  12/2018

OTHER PUBLICATIONS

Huawei, HiSilicon,"Configuration of PC5 and/or Uu for V2V transport",3GPP TSG-RAN WG2 Meeting #93bis R2-162289,Dubrovnik, Croatia, Apr. 11-15, 2016,total 5 pages.
3GPP TR 36.885 V1.0.0 (Mar. 2016);3rd Generation Partnership Project;Technical Specification Group Radio Access Network;Study on LTE-based V2X Services;(Release 14),total 88 pages.
Huawei, HiSilicon,"Summary of [93bis#24][LTEV2V] Tx PC5 and Uu path switch for V2V",3GPP TSG-RAN WG2 Meeting #94 R2-163815,Nanjing, China, May 23-27, 2016,total 23 pages.

* cited by examiner

SERVICE MESSAGE SENDING METHOD, TERMINAL DEVICE, AND NETWORK DEVICE

CROSS-REFERENCE TO RELATED APPLICATIONS

This application is a continuation of International Application No. PCT/CN2016/082854, filed on May 20, 2016, the disclosure of which is hereby incorporated by reference in its entirety.

TECHNICAL FIELD

The present disclosure relates to the field of wireless communications, and in particular, to a method for sending a service message between vehicle terminal devices, a terminal device, and a network device.

BACKGROUND

Vehicle to vehicle (V2V) communications is a communications technology used to perform data transmission and information exchange between vehicles by using a wireless communications technology. As important content in a research of an intelligent transportation system (ITS) and the Internet of Vehicles, the V2V communications mainly provides and supports applications and service transmission that are related to road transportation safety, and is widely recognized as a key technology for improving vehicle driving safety and reducing traffic accidents.

A V2V service carried in the V2V communications is implemented by transmitting a V2V message. The V2V message mainly includes some information related to a vehicle driving status, for example, at least one of a vehicle speed, a driving direction, a longitude and a latitude, an acceleration, whether a brake is applied, whether a lane changes, or the like; and/or some information related to a surrounding road environment, for example, at least one of an accident, a road construction, a transportation facility fault, and the like. By using the V2V communications, a vehicle may exchange V2V messages with another vehicle near the vehicle, so that a vehicle driving system can obtain road condition information or receive an information service related to vehicle driving safety in a timely manner, and a vehicle driver or the vehicle driving system is assisted in predetermining a danger and performing a corresponding operation, to avoid an accident as far as possible. The V2V communications is related to key information of vehicle driving safety, and V2V messages need to be exchanged between vehicles in a timely and accurate manner. Therefore, the V2V communications has communications requirements of "high reliability and a short latency".

Standardization work performed by the 3rd Generation Partnership Project (3GPP) on "Long Term Evolution (LTE)-based vehicle to everything (V2X) communications" covers vehicle communications scenarios such as V2V, vehicle to infrastructure (V2I), and vehicle to pedestrian (V2P). The standardization work aims to provide, based on an LTE communications system, wireless vehicle communications related to road safety. LTE-based V2V communications is an important component of the standardization work, and provides two communications technologies: device to device (D2D) direct communications and LTE base station-based transit communications.

The D2D direct communications technology allows user equipments (UE) to directly communicate with each other by using a PC5 interface. A transmission latency of the technology is relatively low. However, because configured resources are very limited, V2V message transmission congestion and a data collision may easily occur.

In the LTE base station-based transit communications technology, communication is performed by using a Uu interface, and reliability is relatively high. However, UE first needs to send data to a base station, and then the base station forwards the data to another UE. A transmission latency is relatively high, and a relatively large quantity of resources are occupied.

It can be learned that user equipment may not meet a communications requirement of a V2X service regardless of whether the user equipment performs V2X communication by using a PC5 interface or a Uu interface.

SUMMARY

Embodiments of the present disclosure provide a V2X service message sending method, a terminal device, and a network-side device, to improve transmission performance of a V2X service message.

According to a first aspect, the present disclosure provides a V2X service message sending method, including: receiving, by a terminal device, communications interface configuration information from a network-side device, where the communications interface configuration information includes interface indication information, and the interface indication information is used to indicate at least one communications interface used to send a V2X service message; determining, by the terminal device based on the communications interface configuration information, a communications interface from at least two communications interfaces used to send a V2X service message; and sending, by the terminal device, the V2X service message through the determined communications interface. According to the V2X service message sending method, the terminal device may properly select, based on the communications interface configuration information of the network-side device, a communications interface to send a message, thereby improving transmission flexibility of a V2X service message.

In one embodiment, the at least two communications interfaces used to send a V2X service message include a PC5 interface and a Uu interface, and the interface indication information is used to indicate at least one of the PC5 interface and the Uu interface. The interface indication information indicates a first communications interface, the first communications interface is the PC5 interface or the Uu interface, and the terminal device determines the first communications interface to send the V2X service message. Alternatively, the interface indication information indicates at least one communications interface, the at least one communications interface includes the PC5 interface and the Uu interface, the communications interface configuration information further includes a communications interface trigger condition for determining the PC5 interface or the Uu interface, and the terminal device determines one of the PC5 interface and the Uu interface as the communications interface when determining that the communications interface trigger condition is met. According to the foregoing design, the terminal device can properly select a communications interface according to an indication of the network-side device.

In one embodiment, the terminal device determines the PC5 interface as the communications interface when determining that one or more of the following conditions are met:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message CAM or a basic safety message BSM; and a link between the terminal device and the network-side device encounters an exception, where the exception includes at least one of a radio link failure RLF, a handover failure HOF, or out of coverage OoC.

In one embodiment, the terminal device determines the Uu interface as the communications interface when determining that one or more of the following conditions are met:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message DENM or an Internet of Vehicles data Telematics message.

In one embodiment, the radio environment measurement information corresponding to the PC5 interface includes load of a resource pool corresponding to the PC5 interface. The load of the resource pool may be a resource occupation proportion of a D2D direct communications resource pool of the PC5 interface. When the radio environment measurement information corresponding to the PC5 interface is higher than the first threshold, it indicates that current radio environment load corresponding to the PC5 interface is relatively heavy, and the PC5 interface is not suitable for executing a V2X service.

In one embodiment, the radio environment measurement information corresponding to the Uu interface includes signal strength of a cellular link corresponding to the Uu interface. The signal strength of the cellular link may be reference signal received power (RSRP), channel quality information (CQI), or the like. When the radio environment measurement information corresponding to the Uu interface is higher than the second threshold, it indicates that a current radio environment condition corresponding to the Uu interface is relatively good, signal transmission efficiency is relatively high, and the Uu interface is suitable for executing a V2X service.

In one embodiment, the communications interface trigger condition for determining the PC5 interface and the communications interface trigger condition for determining the Uu interface are mutually exclusive. It should be noted that the "mutually exclusive" herein means that the communications interface trigger condition for determining the PC5 interface and the communications interface trigger condition for determining the Uu interface are disjoint, and there is no such a case in which it is determined that both the PC5 interface and the Uu interface can be used to send a V2X service message.

In one embodiment, the communications interface configuration information is carried in system information or a radio resource control RRC dedicated message.

In one embodiment, if determining that a communications interface currently used by the V2X service message is a communications interface different from the determined communications interface, the terminal device stops sending the V2X service message through the currently used communications interface, and sends the V2X service message through the determined communications interface.

In one embodiment, the terminal device configures a logical channel and a protocol stack based on the determined one communications interface, and sends the V2X service message on the logical channel. The logical channel is one or more dedicated logical channels, and each dedicated logical channel is uniquely identified by a channel label. The channel label indicates at least one of a service message priority, a service message type, and a service message QoS class identifier (QCI).

According to a second aspect, the present disclosure provides a V2X service message sending method, including:

generating, by a network-side device, communications interface configuration information, where the communications interface configuration information includes interface indication information, and the interface indication information is used to indicate at least one communications interface used by a terminal device to send a V2X service message; and sending, by the network-side device, the communications interface configuration information, where the communications interface configuration information is used by the terminal device to determine a communications interface from at least two communications interfaces used to send a V2X service message, and the determined communications interface is used by the terminal device to send the V2X service message.

In one embodiment, the at least two communications interfaces used to send a V2X service message include a PC5 interface and a Uu interface, and the interface indication information is used to indicate at least one of the PC5 interface and the Uu interface. The interface indication information indicates a first communications interface, the first communications interface is a PC5 interface or a Uu interface, and the first communications interface is used by the terminal device to send the V2X service message. Alternatively, the interface indication information indicates at least one communications interface, the at least one communications interface includes a PC5 interface and a Uu interface, the communications interface configuration information further includes a communications interface trigger condition for determining the PC5 interface or the Uu interface, and the communications interface trigger condition is used by the terminal device to determine one of the PC5 interface and the Uu interface as a communications interface.

In one embodiment, the communications interface trigger condition includes: the PC5 interface is determined as the communications interface when one or more of the following conditions are met:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message (CAM) or a basic safety message (BSM); and a link between the terminal device and the network-side device encounters an exception, where the exception includes at least one of a radio link failure (RLF), a handover failure (HOF), or out of coverage (OoC).

In one embodiment, the communications interface trigger condition alternatively includes: the Uu interface is determined as the communications interface when one or more of the following conditions are met:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a message to be transmitted is a decentralized environmental notification message (DENM) or an Internet of Vehicles data Telematics message.

In one embodiment, the network-side device sends the communications interface configuration information by using system information or a radio resource control (RRC) dedicated message.

In one embodiment, the network-side device may obtain global information of a radio environment of a network, and therefore may determine and indicate a communications interface for the terminal device based on global information of a radio environment of a current network, and the communications interface is used by the terminal device to send the V2X service message.

According to a third aspect, the present disclosure provides a V2X service message sending method, including:

detecting, by a terminal device, a first communications interface currently used to send a V2X service message;

determining, by the terminal device, a second communications interface, where the first or the second communications interface is determined from at least two communications interfaces used to send a V2X service message, and the second communications interface is different from the first communications interface; and stopping, by the terminal device, sending the V2X service message through the first communications interface; and sending the V2X service message through the second communications interface.

In one embodiment, the at least two communications interfaces used to send a V2X service message include a PC5 interface and a Uu interface; and the first communications interface is any one of the PC5 interface and the Uu interface, and the second communications interface is the other one of the PC5 interface and the Uu interface.

In one embodiment, the terminal device obtains a dedicated logical channel corresponding to the first communications interface, where each dedicated logical channel is uniquely identified by a channel label; and configures the dedicated logical channel corresponding to the first communications interface using a dedicated logical channel and protocol stack communications interface reconfiguration information that are corresponding to the second communications interface.

In one embodiment, when the second communications interface is the Uu interface, the terminal device reports one or more channel labels corresponding to the first communications interface, where the channel label is used to identify the dedicated logical channel corresponding to the first communications interface; and the terminal device receives the communications interface reconfiguration information corresponding to the second communications interface, configures, based on the communications interface reconfiguration information, the dedicated logical channel identified by the channel label, and generates the dedicated logical channel corresponding to the second communications interface. When the second communications interface is the PC5 interface, the terminal device obtains one or more channel labels corresponding to the first communications interface, and generates the communications interface reconfiguration information corresponding to the second communications interface; and the terminal device configures, based on the communications interface reconfiguration information, a dedicated logical channel identified by the channel label, and generates the dedicated logical channel corresponding to the second communications interface.

In one embodiment, the terminal device receives communications interface configuration information, where the communications interface configuration information is sent by a network-side device, the communications interface configuration information includes interface indication information, and the interface indication information is used to indicate at least one communications interface used by the terminal device to send a V2X service message; and the terminal device determines the second communications interface based on the communications interface configuration information. Specifically, if the interface indication information indicates the second communications interface, and the second communications interface is the PC5 interface or the Uu interface, the terminal device determines the second communications interface based on the indication information; or if the interface indication information indicates at least one communications interface, and the at least one communications interface includes the PC5 interface and the Uu interface, the communications interface configuration information further includes a communications interface trigger condition, and the terminal device determines the second communications interface depending on whether the communications interface trigger condition is met, where the second communications interface is one of the PC5 interface and the Uu interface.

In one embodiment, the interface indication information indicates at least one communications interface, the at least one communications interface includes the PC5 interface and the Uu interface, and when the terminal device determines that one or more of the following conditions are met, the terminal device determines that the second communications interface is the PC5 interface:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a message to be transmitted is a cooperative awareness message (CAM) or a basic safety message (BSM); and a link between the terminal device and the network-side device encounters an exception, where the exception includes at least one of a radio link failure (RLF), a handover failure (HOF), or out of coverage (OoC).

In one embodiment, the interface indication information indicates at least one communications interface, the at least one communications interface includes the PC5 interface and the Uu interface, and when the terminal device determines that one or more of the following conditions is met, the terminal device determines that the second communications interface is the Uu interface:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message DENM or an Internet of Vehicles data Telematics message.

According to a fourth aspect, the present disclosure provides a terminal device, including: a receiver, configured to receive communications interface configuration information from a network-side device, where the communications interface configuration information includes interface indication information, and the interface indication information is used to indicate at least one communications interface used by a transmitter to send a V2X service message; a processor, configured to determine, based on the communications interface configuration information, one communications interface from at least two communications interfaces used to send a V2X service message; and the transmitter, configured to send the V2X service message through the determined one communications interface.

In one embodiment, the at least two communications interfaces used to send a V2X service message include a PC5 interface and a Uu interface, and the interface indication information is used to indicate at least one of the PC5 interface and the Uu interface. The interface indication information includes indication information of a first communications interface, and the first communications interface is the PC5 interface or the Uu interface; the processor determines the first communications interface; and the transmitter sends the V2X service message through the first communications interface. Alternatively, the interface indication information indicates at least one communications interface, the at least one communications interface includes the PC5 interface and the Uu interface, the communications interface configuration information further includes a communications interface trigger condition for determining the PC5 interface or the Uu interface, and the processor is configured to determine one of the PC5 interface and the Uu interface as the communications interface when determining that the communications interface trigger condition is met.

In one embodiment, the interface indication information indicates at least one communications interface, and the at least one communications interface includes the PC5 interface and the Uu interface. The processor is further configured to determine the PC5 interface as the communications interface when determining that one or more of the following communications interface trigger conditions are met:
radio environment measurement information corresponding to the PC5 interface is lower than a first threshold;
radio environment measurement information corresponding to the Uu interface is lower than a second threshold;
quality of communication currently performed by using the Uu interface does not meet a specific requirement;
a type of a message to be transmitted is a cooperative awareness message (CAM) or a basic safety message (BSM); and
a link between the terminal device and the network-side device encounters an exception, where the exception includes at least one of a radio link failure (RLF), a handover failure (HOF), or out of coverage (OoC).

In one embodiment, the interface indication information indicates at least one communications interface, and the at least one communications interface includes the PC5 interface and the Uu interface. The processor is further configured to determine the Uu interface as the communications interface when determining that one or more of the following communications interface trigger conditions are met:
radio environment measurement information corresponding to the PC5 interface is higher than a first threshold;
radio environment measurement information corresponding to the Uu interface is higher than a second threshold;
quality of communication currently performed by using the PC5 interface does not meet a specific requirement; and
a message to be transmitted is a decentralized environmental notification message (DENM) or an Internet of Vehicles data Telematics message.

According to a fifth aspect, another terminal device is provided. The terminal device has a function of implementing behavior of the terminal device in the foregoing method procedure. The function may be implemented by hardware in the terminal device executing corresponding software, or may be implemented by one or more units that are corresponding to the foregoing function and that are included in hardware or software.

According to a sixth aspect, the present disclosure provides a network-side device, including: a processor, configured to generate communications interface configuration information, where the communications interface configuration information includes interface indication information, and the interface indication information is used to indicate at least one communications interface used by a terminal device to send a V2X service message; and a transmitter, configured to send the communications interface configuration information by using system information or a radio resource control (RRC) dedicated message, where the communications interface configuration information is used by the terminal device to determine one communications interface from at least two communications interfaces used to send a V2X service message, and the determined one communications interface is used by the terminal device to send the V2X service message.

In one embodiment, the at least two communications interfaces used to send a V2X service message include a PC5 interface and a Uu interface, and the interface indication information is used to indicate at least one of the PC5 interface and the Uu interface. The interface indication information is indication information of a first communications interface, the first communications interface is the PC5 interface or the Uu interface, and the first communications interface is used by the terminal device to send the V2X service message. The interface indication information indicates at least one communications interface, the at least one communications interface includes the PC5 interface and the Uu interface, the communications interface configuration information further includes a communications interface trigger condition for determining the PC5 interface or the Uu interface, and the communications interface trigger condition is used by the terminal device to determine one of the PC5 interface and the Uu interface as a communications interface.

In one embodiment, the communications interface trigger condition includes: the PC5 interface is determined as the communications interface when one or more of the following conditions are met:
radio environment measurement information corresponding to the PC5 interface is lower than a first threshold;
radio environment measurement information corresponding to the Uu interface is lower than a second threshold;
quality of communication currently performed by using the Uu interface does not meet a specific requirement;
a type of a message to be transmitted is a cooperative awareness message (CAM) or a basic safety message (BSM); and
a link between the terminal device and the network-side device encounters an exception, where the exception includes at least one of a radio link failure (RLF), a handover failure (HOF), or out of coverage (OoC).

In one embodiment, the communications interface trigger condition includes: the Uu interface is determined as the communications interface when one or more of the following conditions are met:
radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message (DENM) or an Internet of Vehicles data Telematics message.

According to a seventh aspect, another network-side device is provided. The network-side device has a function of implementing behavior of the network-side device in the foregoing method procedure. The function may be implemented by hardware in the network-side device executing corresponding software, or may be implemented by one or more units that are corresponding to the foregoing function and that are included in hardware or software.

According to an eighth aspect, the present disclosure provides a terminal device, including: a transmitter, configured to send a V2X service message through a communications interface; and a processor, configured to detect a first communications interface currently used to send a V2X service message; determine a second communications interface; and if the first communications interface is different from the second communications interface, instruct the transmitter to: stop sending the V2X service message through the first communications interface, and send the V2X service message through the second communications interface, where the first or the second communications interface is determined from at least two communications interfaces used to send a V2X service message.

In one embodiment, the at least two communications interfaces used to send a V2X service message include a PC5 interface and a Uu interface; and the first communications interface is any one of the PC5 interface and the Uu interface, and the second communications interface is the other one of the PC5 interface and the Uu interface.

In one embodiment, the processor is configured to obtain a dedicated logical channel corresponding to the first communications interface, and configure the dedicated logical channel corresponding to the first communications interface by using a dedicated logical channel and protocol stack communications interface reconfiguration information that are corresponding to the second communications interface, where each dedicated logical channel is uniquely identified by a channel label. Specifically, when determining that the second communications interface is the Uu interface, the processor reports one or more channel labels corresponding to the first communications interface, where the channel label is used to identify the dedicated logical channel corresponding to the first communications interface; and configures, based on the communications interface reconfiguration information, the dedicated logical channel identified by the channel label, and generates the dedicated logical channel corresponding to the second communications interface; and a receiver is configured to receive the communications interface reconfiguration information corresponding to the second communications interface. When determining that the second communications interface is the PC5 interface, the processor obtains one or more channel labels corresponding to the first communications interface, and generates the communications interface reconfiguration information corresponding to the second communications interface; and configures, based on the communications interface reconfiguration information, a dedicated logical channel identified by the channel label, and generates the dedicated logical channel corresponding to the second communications interface.

In one embodiment, the receiver is configured to receive communications interface configuration information, where the communications interface configuration information includes interface indication information, and the interface indication information is used to indicate at least one communications interface used by the transmitter to send a V2X service message. If the interface indication information indicates the second communications interface, and the second communications interface is the PC5 interface or the Uu interface, the processor is configured to determine the second communications interface based on the indication information; or if the interface indication information indicates at least one communications interface, and the at least one communications interface includes the PC5 interface and the Uu interface, the communications interface configuration information further includes a communications interface trigger condition, and the processor is configured to determine the second communications interface depending on whether the communications interface trigger condition is met.

In one embodiment, the interface indication information indicates at least one communications interface, the at least one communications interface includes the PC5 interface and the Uu interface, and when determining that the communications interface trigger condition meets one or more of the following conditions, the processor determines that the second communications interface is the PC5 interface:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message (CAM) or a basic safety message (BSM); and a link between the terminal device and the network-side device encounters an exception, where the exception includes at least one of a radio link failure (RLF), a handover failure (HOF), or out of coverage (OoC).

In one embodiment, the interface indication information indicates at least one communications interface, the at least one communications interface includes the PC5 interface and the Uu interface, and when determining that the communications interface trigger condition meets one or more of the following conditions, the processor determines that the second communications interface is the Uu interface:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a message to be transmitted is a decentralized environmental notification message (DENM) or an Internet of Vehicles data Telematics message.

According to a ninth aspect, another terminal device is provided. The terminal device has a function of implementing behavior of the terminal device in the foregoing method procedure. The function may be implemented by hardware in the terminal device executing corresponding software, or may be implemented by one or more units that are corresponding to the foregoing function and that are included in hardware or software.

Compared with the prior art, in the solutions provided in the present disclosure, a terminal device performs selection and conversion between a D2D direct communications mode based on a PC5 interface and an LTE base station-based transit communications mode based on a Uu interface. Advantages of the two communications modes are fully utilized, and transmission performance of a V2X service message is improved.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
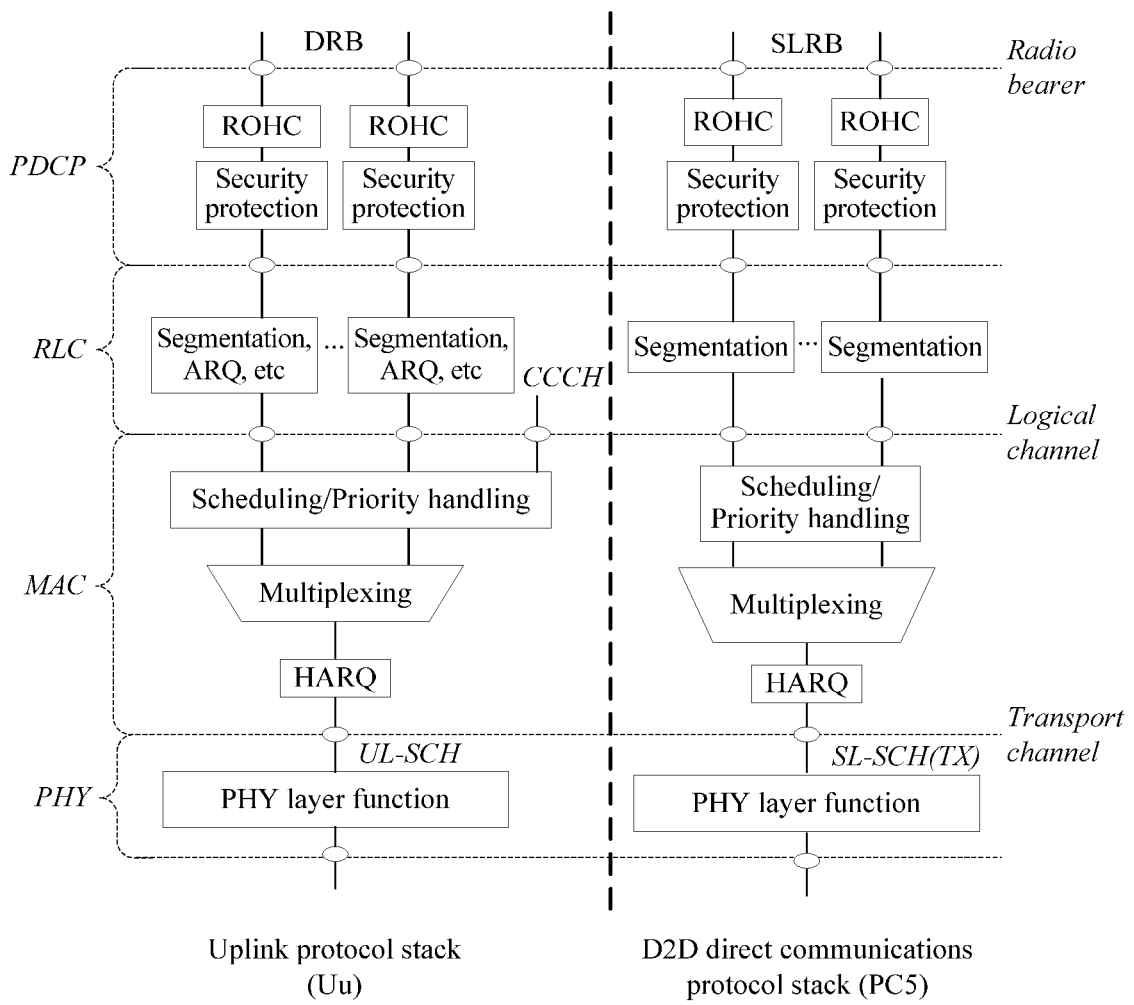
FIG. 1 is a schematic diagram of a V2X service message communications protocol stack according to an embodiment of the present disclosure.

To make a person skilled in the art better understand the solutions in the embodiments of the present disclosure, the following further describes the embodiments of the present disclosure with reference to the accompanying drawings and implementations.

First, the following briefly describes communication processes of V2V communications technologies: a D2D direct communications technology and an LTE base station-based transit communications technology.

D2D Direct Communications Technology:

In the D2D direct communications technology, under control of a base station, user equipment can directly communicate with another user equipment in a form of broadcast. An air interface used for direct communication between user equipments is referred to as a PC5 interface, and a corresponding radio link is referred to as a D2D link (Sidelink, SL). On a communications path of communication performed by using a PC5 interface, UE configures a radio protocol stack corresponding to the PC5 interface, processes data by using the protocol stack, and transmits processed data by using the PC5 interface after obtaining a D2D direct communications resource.

To prevent D2D direct communications from interfering with existing communication in an LTE system, the LTE system configures some resource pools dedicated for the D2D direct communications. The resource pool is a set of time and frequency resources used for wireless communication. D2D direct communications data can be transmitted only on a PC5 interface by using a D2D direct communications resource in a D2D direct communications resource pool configured by the LTE system.

It should be noted that, in the existing D2D direct communications technology, UE may obtain a D2D direct communications resource in two manners: a manner based on autonomous selection of UE and a manner based on scheduling of a base station. In the manner based on autonomous selection of UE, the UE autonomously selects a resource from a D2D direct communications resource pool configured by a base station. In the manner based on scheduling of a base station, the base station selects a resource for the UE from a D2D direct communications resource pool. The D2D direct communications technology has advantages such as a low latency and a relatively small quantity of occupied resources. However, when D2D direct communications resources are limited and/or a service amount is relatively large, because a D2D direct communications resource pool has relatively high load, the manner in which UE autonomously selects a resource causes frequent collisions between data transmitted by UEs, thereby resulting in severe interference on data transmission between UEs and significantly affecting communication performance. In the manner based on scheduling of a base station, sufficient transmission resources cannot be obtained for data of UE to be transmitted in a timely manner. As a result, the UE discards a data packet that cannot be transmitted in a timely manner, and a user service environment is severely affected.

LTE Base Station-Based Transit Communications Technology:

In the LTE base station-based transit communications technology, UE first sends a V2V message to a base station, and then the base station sends the V2V message to another UE for receiving. An air interface used for uplink transmission or downlink transmission between the UE and the base station is referred to as a Uu interface. In a communications path of communication performed by using the Uu interface, UE sends a V2V message to a base station in a manner of uplink (UL) unicast, and the base station sends the V2V message to another UE in a manner of downlink (DL) broadcast. Specifically, the UE configures a radio bearer part of the Uu interface, processes data by using a radio protocol stack corresponding to the Uu interface, configures a base station-serving gateway (S-GW)/PDN gateway (P-GW)-V2V server core network bearer part by using a mobility management entity (MME), and transmits processed data through the Uu interface by using an uplink resource of an LTE system.

In the LTE base station-based transit communications technology, a base station schedules resources in a centralized manner, and the base station schedules orthogonal radio resources for UEs. This effectively addresses a problem of communication interference between UEs, and is a transmission mode with relatively high reliability. However, in the LTE base station-based transit communications technology, transmit-end UE first needs to send data to a base station by using an uplink resource, and then the base station forwards the data to receive-end UE by using a downlink resource, to implement communication and information exchange between the UEs. Compared with the D2D direct communications technology that allows direct communication between UEs, the LTE base station-based transit communications technology has lower resource utilization and a higher latency.

Based on the foregoing descriptions and advantage and disadvantage analysis of the existing V2V communications technologies, the embodiments of the present disclosure provide a V2X service message sending method and apparatus, to flexibly send a V2X service message.

FIG. 1 shows, from a perspective of a terminal device, different radio protocol stacks that are corresponding to an LTE base station-based transit communications technology in which a Uu interface is used (left) and a D2D direct communications technology in which a PC5 interface is used (right). Cellular uplink data transmission of a terminal device acting as a transmit end needs to be processed by using an uplink protocol stack of the Uu interface, and data is sent to a base station by using an uplink resource of an LTE system. D2D data transmission of the terminal device is processed by using a D2D direct communications protocol stack of the PC5 interface, and D2D data is transmitted between terminal devices by using a D2D direct communications resource configured by the LTE system.

Figure 2:
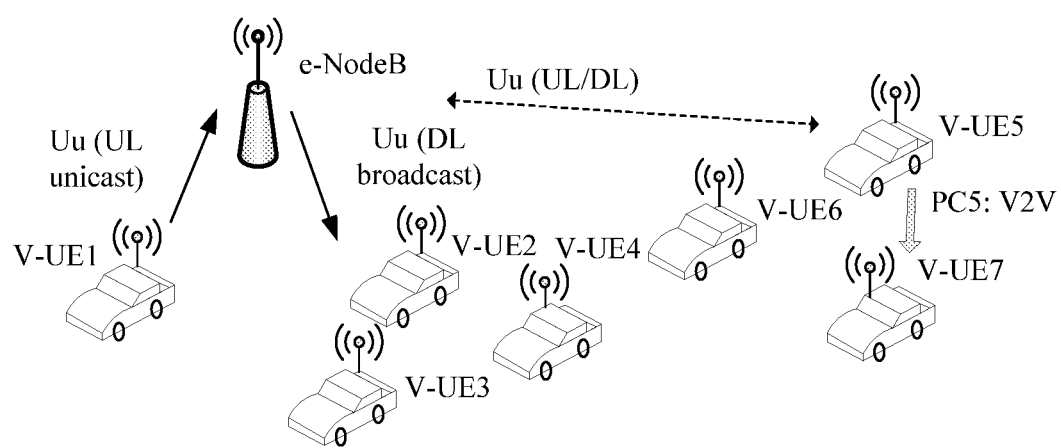
FIG. 2 is a schematic diagram of a V2X service message communications application scenario according to an embodiment of the present disclosure.

FIG. 2 is a communication scenario diagram according to an embodiment of the present disclosure. It should be noted that the communication scenario diagram is merely an example for description, and an application scope of the present disclosure is not limited thereto. A V2V service of a V2X service is used as an example. As shown in FIG. 2, the communication scenario diagram includes vehicle user equipments V-UE1 to V-UE7 and a base station eNodeB. Certainly, the communication scenario diagram may further include core network bearer parts such as an MME, an S-GW/P-GW, and a V2V server. This embodiment of the present disclosure is not limited thereto. In the communication scenario diagram, V2V communication may be performed between vehicle user equipments V-UEs. For example, the vehicle user equipment V-UE1 may perform V2V communication with another vehicle user equipment by using an LTE base station-based transit communications technology. The V-UE1 transmits a V2V message to the base station in a manner of UL unicast by using a Uu interface. The base station broadcasts the V2V message to the other vehicle user equipments V-UE2 to V-UE4 in a manner of DL broadcast. The vehicle user equipment V-UE5 directly broadcasts, through a PC5 interface by using D2D direct communications technology, a V2V message generated by the V-UE5 to the nearby vehicle user equipments V-UE6 and V-UE7. The V-UE5 also retains UL and DL connections to the base station at the Uu interface. However, the connections are used to exchange only control information with the base station, and include no V2V message.

It should be noted that, although the V2X service is described by using the V2V service as an example in the foregoing descriptions, a person skilled in the art should know that the embodiments of the present disclosure is not only applicable to the V2V service, but may also be applicable to other V2X services, such as V2I, V2P, and a new V2X service.

A terminal device in the embodiments of the present disclosure may be a device providing voice and/or data connectivity for a user, a handheld device with a wireless connection function, or another processing device connected to a wireless modem. A wireless terminal may communicate with one or more core networks by using a radio access network (RAN). The wireless terminal may be a mobile terminal, such as a mobile phone (or referred to as a "cellular" phone) or a computer with a mobile terminal, for example, may be a portable, pocket-sized, handheld, computer built-in, or in-vehicle mobile apparatus (such as vehicle user equipment V-UE), which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile console, a remote station, an access point, a remote terminal, an access terminal, a user terminal, a user agent, a user device, or user equipment.

A network device in the embodiments of the present disclosure may be a base station or an access node, or may be a device that communicates with the wireless terminal over an air interface in an access network by using one or more sectors. The base station may be configured to perform conversion between an over-the-air frame and an IP packet that are received, and is used as a router between the wireless terminal and another part of the access network. The another part of the access network may include an Internet Protocol (IP) network. The base station may further coordinate attribute management of an air interface. For example, the base station may be a base transceiver station (BTS, Base Transceiver Station) in GSM or CDMA, or may be a NodeB (NodeB) in WCDMA, or may be an evolved NodeB (eNB or e-NodeB, evolved NodeB) in LTE. This is not limited in this application.

The following describes how to flexibly execute a V2X service in the present disclosure with reference to a first embodiment.

Figure 3:
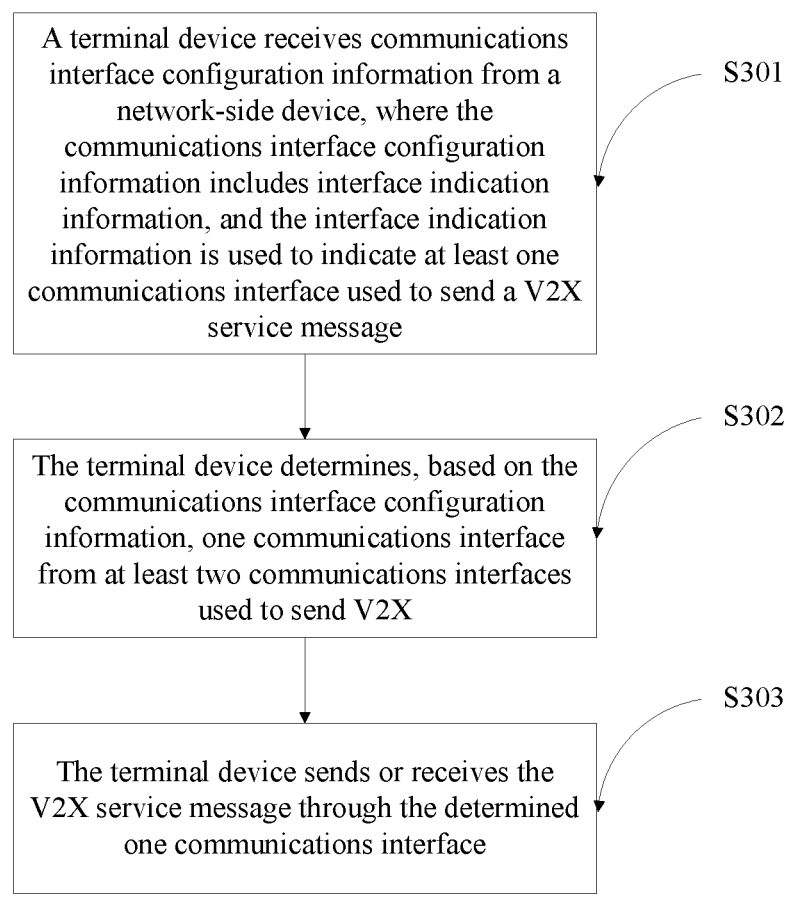
FIG. 3 is a schematic flowchart of sending a V2X service message according to an embodiment of the present disclosure.

FIG. 3 shows a procedure of a V2X service message sending method defined in the first embodiment of the present disclosure.

Operation S301: A terminal device receives communications interface configuration information from a network-side device, where the communications interface configuration information includes interface indication information, and the interface indication information is used to indicate at least one communications interface used to send a V2X service message.

Operation S302: The terminal device determines, based on the communications interface configuration information, one communications interface from at least two communications interfaces used to send V2X service message.

Operation S303: The terminal device sends the V2X service message through the determined one communications interface.

In one embodiment of the present disclosure, the V2X service message sending method is defined, so that a vehicle terminal device may select, depending on a requirement, an appropriate communications interface from a PC5 interface and a Uu interface for sending a V2X message, thereby improving transmission performance of a V2X service message.

In another embodiment, the at least two communications interfaces used to send V2X include a PC5 interface and a Uu interface, and the interface indication information is used to indicate at least one of the PC5 interface and the Uu interface. Specifically, the network-side device may configure an optional V2X transmission interface depending on whether functions of the network-side device include a function of supporting transmission at the PC5 interface and the Uu interface, and/or based on an operation policy of an operator to which the network-side device belongs for a V2X service, for example, whether the PC5 interface and/or the Uu interface is used to support V2V service transmission; and indicate the optional V2X transmission interface by using interface indication information. This may depend on functions of a base station and an operation policy of an operator, and is not specifically limited herein.

For example, the interface indication information includes indication information of a first communications interface, the first communications interface is the PC5 interface or the Uu interface, and the terminal device determines the first communications interface to send the V2X service message.

In one embodiment, if the first communications interface is the PC5 interface, the terminal device determines, for the V2X service, to perform communication by using the PC5 interface. In this case, the terminal device configures a radio protocol stack corresponding to the PC5 interface, processes data by using the protocol stack, and obtains a D2D direct communications resource to transmit processed data. In one embodiment, the terminal device obtains the D2D direct communications resource from a D2D direct communications resource pool according to a manner of autonomous selection, or the terminal device obtains the D2D direct communications resource from a D2D direct communications resource pool according to a manner of scheduling by a base station.

In one embodiment, if the first communications interface is the Uu interface, the terminal device determines, for the V2X service, to perform communication by using the Uu interface. In this case, the terminal device configures a radio protocol stack corresponding to the Uu interface, processes data by using the protocol stack, establishes an end-to-end connection between the terminal device and the network-side device, configures a dedicated bearer, and transmits processed data by using the dedicated bearer.

For another example, the interface indication information indicates at least one communications interface, and the at least one communications interface includes the PC5 interface and the Uu interface. In this case, the communications interface configuration information further includes a communications interface trigger condition for determining the PC5 interface or the Uu interface. When determining that the communications interface trigger condition is met, the terminal device determines one of the PC5 interface and the Uu interface as a communications interface. The communications interface trigger condition may be selectively configured based on factors such as a wireless transmission environment and/or a message type of the PC5 interface and the Uu interface. Specifically, the communications interface trigger condition may be selected and configured depending on an actual requirement.

In one embodiment, the PC5 interface is determined as the communications interface when the communications interface trigger condition meets one or more of the following conditions:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message (CAM) or a basic safety message (BSM); and a link between the terminal device and the network-side device encounters an exception, where the exception includes at least one of a radio link failure (RLF), a handover failure (HOF), or out of coverage (OoC).

Specifically, the radio environment measurement information corresponding to the PC5 interface includes load of a resource pool corresponding to the PC5 interface. The load of the resource pool may be a resource occupation proportion of a D2D direct communications resource pool of the PC5 interface. When the radio environment measurement information corresponding to the PC5 interface is lower than the first threshold, it indicates that current radio environment load corresponding to the PC5 interface is appropriate, and the PC5 interface is suitable for executing the V2X service.

Specifically, the radio environment measurement information corresponding to the Uu interface includes signal strength of a cellular link corresponding to the Uu interface. The signal strength of the cellular link may be reference signal received power (RSRP), channel quality information (CQI), or the like. When the radio environment measurement information corresponding to the Uu interface is lower than the second threshold, it indicates that a current radio environment condition corresponding to the Uu interface is relatively poor, signal transmission efficiency is likely to be low, and the Uu interface is not suitable for executing the V2X service.

Specifically, that quality of communication currently performed by using the Uu interface does not meet a requirement includes: A vehicle terminal device is currently using the Uu interface as a transmission interface to transmit a V2X message, but a quality of service (QoS) requirement of the V2X service is not met. The Uu interface is not suitable for executing the V2X service.

In one embodiment, the Uu interface is determined as the communications interface when the communications interface trigger condition meets one or more of the following conditions:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message (DENM) or a Telematics message.

The Telematics is a comprehensive technology combining a wireless communications technology, a satellite navigation system, a network communications technology, and an in-vehicle computer. The Telematics message is a mainstream Internet of Vehicles service message type.

Specifically, the radio environment measurement information corresponding to the PC5 interface includes load of a resource pool corresponding to the PC5 interface. The load of the resource pool may be a resource occupation proportion of a D2D direct communications resource pool of the PC5 interface. When the radio environment measurement information corresponding to the PC5 interface is higher than the first threshold, it indicates that current radio environment load corresponding to the PC5 interface is relatively heavy, and the PC5 interface is not suitable for executing a V2X service.

Specifically, the radio environment measurement information corresponding to the Uu interface includes signal strength of a cellular link corresponding to the Uu interface. The signal strength of the cellular link may be reference signal received power (RSRP), channel quality information (CQI), or the like. When the radio environment measurement information corresponding to the Uu interface is higher than the second threshold, it indicates that a current radio environment condition corresponding to the Uu interface is relatively good, signal transmission efficiency is relatively high, and the Uu interface is suitable for executing a V2X service.

Specifically, that quality of communication currently performed by using the PC5 interface does not meet a requirement includes: A vehicle terminal device is currently using the PC5 interface as a communications interface to transmit a V2X message, but a quality of service (QoS) requirement of the V2X service is not met. The PC5 interface is not suitable for executing the V2X service.

In one embodiment, the communications interface trigger condition for determining the PC5 interface and the communications interface trigger condition for determining the Uu interface may be mutually exclusive. It should be noted that the "mutually exclusive" herein means that the communications interface trigger condition for determining the PC5 interface and the communications interface trigger condition for determining the Uu interface are disjoint, and there is no such a case in which it is determined that both the PC5 interface and the Uu interface can be used to send a V2X service message.

For example, a group of communications interface trigger conditions are defined. If the group of communications interface trigger conditions are met, one of the PC5 interface and the Uu interface is determined as a communications interface to send a V2X service message; otherwise, the other one is used as a communications interface to send a V2X service message. The group of communications interface trigger conditions may include one or more communications interface trigger conditions.

The group of communications interface trigger conditions may include one or more of the communications interface trigger conditions defined in the first embodiment of the present disclosure, or may include another related condition defined depending on an actual network environment and requirement. Optionally, if the group of communications interface trigger conditions are "the radio environment measurement information corresponding to the PC5 interface is lower than the first threshold", the PC5 interface is determined as the communications interface when the foregoing trigger condition is met; or the Uu interface is determined as the communications interface when the foregoing trigger condition is not met. Optionally, if the group of communications interface trigger conditions are "the radio environment measurement information corresponding to the PC5 interface is higher than the first threshold, and the radio environment measurement information corresponding to the Uu interface is higher than the second threshold", the Uu interface is determined as the communications interface when the foregoing trigger conditions are met; or the PC5 interface is determined as the communications interface when the foregoing trigger conditions are not met. The group of communications interface trigger conditions may be one communications interface trigger condition, or may be set of a plurality of communications trigger conditions.

In this embodiment of the present disclosure, when at least one of the foregoing communications interface trigger conditions is met, the terminal device may perform a corresponding step of determining the communications interface for the V2X service, and further send the V2X service message through the determined one communications interface. When the foregoing trigger condition is met, usually, the V2X service needs to be executed, or a communication environment changes. When the foregoing trigger condition is met, the terminal device performs a corresponding step of determining a communications path for the V2X service, so that the terminal device can flexibly select a communications path for the V2X service, and can further select a more suitable communications interface from the at least two communications interface to send the V2X service message, for example, select a communications interface with higher reliability or higher efficiency.

In one embodiment, when determining that the communications interface trigger condition is not met, the terminal device may determine the other one of the PC5 interface and the Uu interface as a communications interface.

In one embodiment, when the terminal device determines that all the communications interface trigger conditions for selecting the PC5 interface or the Uu interface are met, the terminal device may randomly select one of the PC5 interface and the Uu interface, and determine to send the V2X service message through the selected communications interface; or may preferentially select one of the interfaces, namely, the PC5 interface or the Uu interface, according to a requirement of the terminal device, and determine to send the V2X service message through the preferentially selected communications interface. An actual random selection manner or preferential selection manner is not specifically limited herein.

In another embodiment, after operation S302, the first embodiment of the present disclosure may further include: if determining that a communications interface currently used by the V2X service is a communications interface different from the determined one communications interface, the terminal device stops sending the V2X service message through the currently used communications interface; and sending the V2X service message through the determined one communications interface.

In still another embodiment, the terminal device configures a logical channel and a protocol stack based on the determined one communications interface, and sends the V2X service message on the logical channel. The logical channel is one or more V2X dedicated logical channels.

In one embodiment, the V2X dedicated logical channel may be configured as a logical channel corresponding to the PC5 interface, or may be configured as a logical channel corresponding to the Uu interface. Depending on selection and determining of the terminal device, the V2X dedicated logical channel may switch between a mode of corresponding to the PC5 interface and a mode of corresponding to the Uu interface.

In one embodiment, each V2X dedicated logical channel is uniquely identified by a channel label.

For example, the terminal device determines a communications interface, and configures a V2X dedicated logical channel for the PC5 interface or the Uu interface to send a V2X service message. The configuration includes: configuring corresponding protocol stack configuration parameters such as a Packet Data Convergence Protocol (PDCP) entity, a radio link control (RLC) entity, and a logical channel identity (LCID); and associating the configured V2X dedicated logical channel with a V2X channel label. In one embodiment, if the communications interface is the PC5 interface, the terminal device may configure a V2X dedicated logical channel for the PC5 interface, and configure the foregoing protocol stack parameters. In one embodiment, if the communications interface is the Uu interface, the terminal device needs to configure a V2X dedicated logical channel for the Uu interface based on configuration information delivered from the network-side device, and configure the foregoing protocol stack parameters.

The channel level may be a V2X service channel identifier. Each configured V2X dedicated logical channel is associated with a unique V2X channel identifier as a channel label.

For example, the channel label may be a scalar, for example, a decimal number ranging from 0 to 10.

Specifically, a value of the channel label may be corresponding to a set of a group of V2X communication-related parameters. The parameters may include one or more of parameters such as a V2X service message priority, a service message type, and a service message QoS class identifier QCI; or may include other V2X service-related parameters. This is not specifically limited herein.

In this embodiment of the present disclosure, all logical channels used to send V2X service messages are V2X dedicated logical channels. One or more V2X dedicated logical channels may be configured. Each V2X dedicated logical channel is corresponding to a group of independent protocol stack parameter configurations such as a PDCP entity, an RLC entity, and an LCID, is associated with a unique channel label, and is used to independently send a corresponding V2X service message. V2X dedicated logical channels and protocol stacks are flexibly configured and switched depending on different types of determined communications interfaces, thereby implementing flexible processing of the V2X service.

In yet another embodiment, the communications interface configuration information may be carried in system information or a radio resource control RRC dedicated message. The system information may be sent in a manner of broadcast. This is not specifically limited herein.

For example, the system information may be system information for D2D direction communications of a user: SystemInformationBlockType18; or may be another type of system information.

For another example, the RRC dedicated message may be an RRC connection reconfiguration message: RRCConnectionReconfiguration; or may be another type of RRC dedicated message.

For example, a first field and a second field are configured in information or a message that carries the communications interface configuration information. The first field is used to identify that only the PC5 interface is supported, only the Uu interface is supported, or both the PC5 interface and the Uu interface are supported. The second field is used to indicate the communications interface trigger condition, and specific indication content is adaptively configured based on the identification of the first field.

Specifically, if the first field identifies that only the PC5 interface is supported, or only the Uu interface is supported, the second field is empty, and no communications interface trigger condition is required; or if the first field identifies that both the PC5 interface and the Uu interface are supported, the second field indicates the trigger condition for determining the PC5 interface and the trigger condition for determining the Uu interface.

In yet another embodiment, the network-side device may send interface indication information to the terminal device by using dedicated signaling, to specify a communications interface, such as the PC5 interface or the Uu interface, for sending the V2X service message.

For example, the network-side device may send, at any time and under any condition by using dedicated signaling, interface indication information to a vehicle terminal device within coverage of the network-side device, to specify a communications interface for the terminal device to send a V2X service message. The communications interface may be any one of the PC5 interface or the Uu interface.

In one embodiment, the network-side device may obtain global information of a radio environment of a network, and therefore may determine and indicate a communications interface for the terminal device based on global information of a radio environment of a current network, and the communications interface is used by the terminal device to send the V2X service message.

For example, the global information of the radio environment may be a quantity of vehicle terminal devices in the current network, the load of the resource pool corresponding to the PC5 interface, and quality of a cellular link between the terminal device and the network-side device.

In one embodiment, the dedicated signaling may be a radio resource control RRC dedicated message.

In yet another embodiment, the interface indication information is indication information of a first communications interface, the first communications interface is the PC5 interface or the Uu interface, and the communications interface configuration information further includes a communications interface trigger condition for determining the first communications interface. When determining that the communications interface trigger condition is met, the terminal device determines the first communications interface as a communications interface. Optionally, when determining that the communications interface trigger condition is not met, the terminal device determines a second communications interface as a communications interface. The second communications interface is the other one of the PC5 interface and the Uu interface. For example, the communications interface configuration information includes indication information and the communications interface trigger condition of PC5. When determining that the communications interface trigger condition is met, the terminal device determines the PC5 interface as a communications interface. The communications interface trigger condition may be selectively configured based on factors such as a wireless transmission environment and/or a message type of the PC5 interface and the Uu interface. Specifically, the communications interface trigger condition may be selected and configured depending on an actual requirement.

In one embodiment of the present disclosure, the terminal device may select, depending on a requirement, a communications interface from the PC5 interface and the Uu interface to send a V2X message. Therefore, a communications interface switching method also needs to be implemented, so that after selecting the one communications interface, the terminal device may stop sending a current V2X service message, and instead, send the V2X service message through the selected one communications interface.

The following describes another V2X service message sending method using a second embodiment of the present disclosure.

Figure 4:
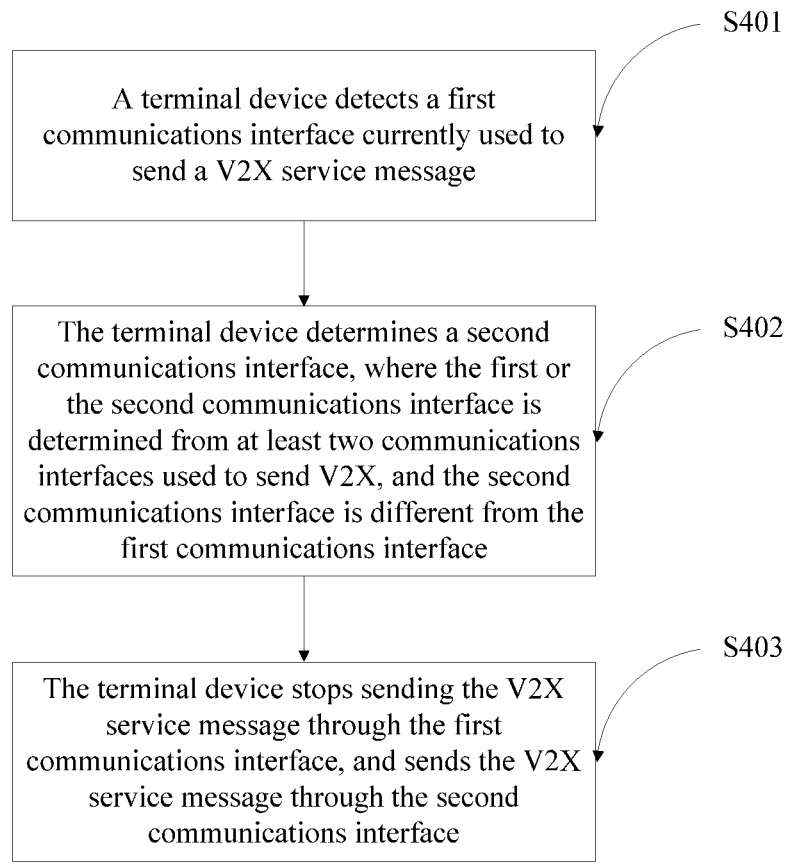
FIG. 4 is a schematic flowchart of sending a V2X service message according to an embodiment of the present disclosure.

FIG. 4 shows a procedure of a V2X service message sending method defined in the second embodiment of the present disclosure.

Operation S401: A terminal device detects a first communications interface currently used to send a V2X service message.

Operation S402: The terminal device determines a second communications interface, where the first or the second communications interface is determined from at least two communications interfaces used to send V2X, and the second communications interface is different from the first communications interface.

Operation S403: The terminal device stops sending the V2X service message through the first communications interface, and sends the V2X service message through the second communications interface.

The second embodiment of the present disclosure defines the another V2X service message sending method, so that a vehicle terminal device implements switching between different communications interfaces in a V2X message sending process, thereby improving transmission flexibility of a V2X service message.

In one embodiment, the at least two communications interfaces used to send V2X include a PC5 interface and a Uu interface; and the first communications interface is any one of the PC5 interface and the Uu interface, and the second communications interface is the other one of the PC5 interface and the Uu interface.

In another embodiment, the terminal device obtains a dedicated logical channel corresponding to the first communications interface, where each dedicated logical channel is uniquely identified by a channel label; and configures the dedicated logical channel corresponding to the first communications interface by using a dedicated logical channel and protocol stack communications interface reconfiguration information that are corresponding to the second communications interface. The dedicated logical channel is a V2X dedicated logical channel.

In one embodiment, when the second communications interface is the Uu interface, the terminal device reports, to a network-side device, one or more channel labels corresponding to the first communications interface, where the channel label is used to identify the dedicated logical channel corresponding to the first communications interface; and the network-side device generates the communications interface reconfiguration information corresponding to the second communications interface, and sends the communications interface reconfiguration information to the terminal device, so that the terminal device configures, based on the communications interface reconfiguration information, the dedicated logical channel identified by the channel label, and generates the dedicated logical channel corresponding to the second communications interface.

In an aspect, the terminal device may send, to the network-side device in a form of a list, information about channel labels associated with all V2X dedicated logical channels configured for the PC5 interface.

In another aspect, the terminal device may report the one or more channel labels by using an RRC dedicated message. The information about the channel labels may be used as a field and added to an RRC dedicated message SidelinkUEInformation, or may be used as an independent RRC dedicated message, and is sent by the terminal device to the network-side device.

In still another aspect, the communications interface reconfiguration information sent by the network-side device to the terminal device includes a configuration parameter and an associated channel label. The configuration parameter and the associated channel label may be added to an RRC dedicated message RRCConnectionReconfiguration and sent to the terminal device.

In one embodiment, when the second communications interface is the PC5 interface, the terminal device obtains one or more channel labels corresponding to the first communications interface, and generates the communications interface reconfiguration information corresponding to the second communications interface; and the terminal device configures, based on the communications interface reconfiguration information, a dedicated logical channel identified by the channel label, and generates the dedicated logical channel corresponding to the second communications interface.

In one embodiment, the terminal device receives communications interface configuration information, where the communications interface configuration information is sent by the network-side device, the communications interface configuration information includes interface indication information, and the interface indication information is used to indicate at least one communications interface used to send a V2X service message; or the terminal device determines the second communications interface depending on whether a communications interface trigger condition is met.

For example, if the interface indication information indicates one communications interface, and the communications interface is the PC5 interface or the Uu interface, the terminal device determines the indicated one communications interface as the second communications interface.

For another example, if the interface indication information indicates at least one communications interface, and the at least one communications interface includes the PC5 interface and the Uu interface, the communications interface configuration information further includes the communications interface trigger condition, and the terminal devices determines the second communications interface depending on whether the communications interface trigger condition is met. The second communications interface is one of the PC5 interface and the Uu interface.

In still another embodiment, the network-side device may send interface indication information to the terminal device by using dedicated signaling, to specify a communications interface, such as the PC5 interface or the Uu interface, for sending the V2X service message.

Meanings and configurations of the "dedicated logical channel", the "channel label", the "communications interface trigger condition", and the "dedicated signaling" in the second embodiment of the present disclosure are the same as the meanings and the configurations of the same terms in the first embodiment of the present disclosure. For details, refer to the descriptions in the first embodiment. Details are not described herein again.

It should be noted that, in this embodiment of the present disclosure, before determining the first communications interface to send the V2X service message, the terminal device may have not used any V2X service message communications interface to perform communication, and have not established a V2X dedicated logical channel corresponding to a corresponding communications interface. In this case, if the determined one communications interface is the Uu interface, the network-side device generates communications interface reconfiguration information, and sends the communications interface reconfiguration information to the terminal device, so that the terminal device configures, based on the communications interface reconfiguration information, a V2X dedicated logical channel for the Uu interface and a corresponding protocol stack; or if the determined one communications interface is the PC5 interface, the terminal device may directly configure a V2X dedicated logical channel for the PC5 interface and a corresponding protocol stack. In this way, it can be ensured that the V2X service message is sent by using a V2X dedicated logical channel uniquely identified by a channel label.

Figure 5:
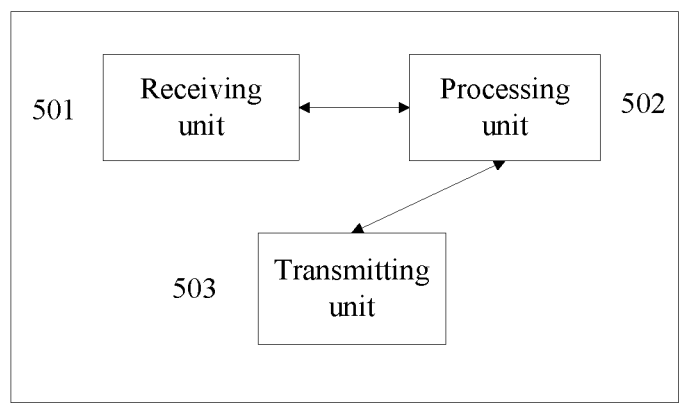
FIG. 5 is a possible schematic structural diagram of a terminal device according to an embodiment of the present disclosure.

FIG. 5 is a possible schematic structural diagram of a terminal device according to a first embodiment of the present disclosure.

The terminal device may include a receiving unit 501, a processing unit 502, and a transmitting unit 503, and depending on an actual requirement, may further include a storage unit 504, configured to store related data information.

The receiving unit 501 is configured to receive communications interface configuration information from a network-side device, where the communications interface configuration information includes interface indication information, and the interface indication information is used to indicate at least one communications interface used by the transmitting unit 503 to send a V2X service message.

The processing unit 502 is configured to determine, based on the communications interface configuration information, one communications interface from at least two communications interfaces used to send a V2X service message.

The transmitting unit 503 is configured to send the V2X service message through the determined one communications interface.

In an optional embodiment, the at least two communications interfaces used to send a V2X service message include a PC5 interface and a Uu interface, and the interface indication information is used to indicate at least one of the PC5 interface and the Uu interface.

Optionally, the interface indication information is indication information of a first communications interface, and the first communications interface is the PC5 interface or the Uu interface. The processing unit 502 determines the first communications interface. The transmitting unit 503 sends the V2X service message through the first communications interface.

Optionally, the interface indication information indicates at least one communications interface, the at least one communications interface includes the PC5 interface and the Uu interface, and the communications interface configuration information further includes a communications interface trigger condition for determining the PC5 interface or the Uu interface. The processing unit 502 is configured to determine one of the PC5 interface and the Uu interface as a communications interface when determining that the communications interface trigger condition is met.

For example, the processing unit 502 is further configured to determine the PC5 interface as the communications interface when determining that one or more of the following communications interface trigger conditions are met:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message CAM or a basic safety message BSM; and a link between the terminal device and the network-side device encounters an exception, where the exception includes at least one of a radio link failure RLF, a handover failure HOF, or out of coverage OoC.

For another example, the processing unit 502 is further configured to determine the Uu interface as the communications interface when determining that one or more of the following communications interface trigger conditions are met:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message DENM or an Internet of Vehicles data Telematics message.

In another optional embodiment, the processing unit 502 is further configured to: if determining that a communications interface currently used by the V2X service message is a communications interface different from the determined one communications interface, stop the transmitting unit 503 from sending the V2X service message through the currently used communications interface; and the transmitting unit 503 is configured to send the V2X service message through the determined one communications interface.

In still another embodiment, the processing unit 502 configures a logical channel and a protocol stack based on the determined one communications interface, and the transmitting unit 503 sends the V2X service message on the configured logical channel.

Specifically, the logical channel is one or more dedicated logical channels, and each dedicated logical channel is uniquely identified by a channel label. The channel label indicates at least one of a service message priority, a service message type, and a service message QoS class identifier QCI.

It should be noted that, for specific implementations of receiving, by the terminal device, the communications interface configuration information, configuring the communications interface, and sending the V2X service message, reference may be made to the method descriptions in the first embodiment of the present disclosure. The terminal device in this embodiment and the method in the first embodiment of the present disclosure corresponding to FIG. 3 are based on a same concept. A technical effect brought by the terminal device is the same as that of the first embodiment of the present disclosure. Specific functions of the receiving unit 501, the processing unit 502, and the transmitting unit 503 that are included in the terminal device in this embodiment, and terms and implementation details thereof are corresponding to the functions in the embodiment corresponding to FIG. 3. For specific content, refer to the descriptions in the method embodiment corresponding to FIG. 3 in the present disclosure. Details are not described herein again.

The terminal device in this embodiment can select, depending on a requirement, an appropriate communications interface from the PC5 interface and the Uu interface for sending a V2X message, thereby improving transmission performance of a V2X service message.

Figure 6:
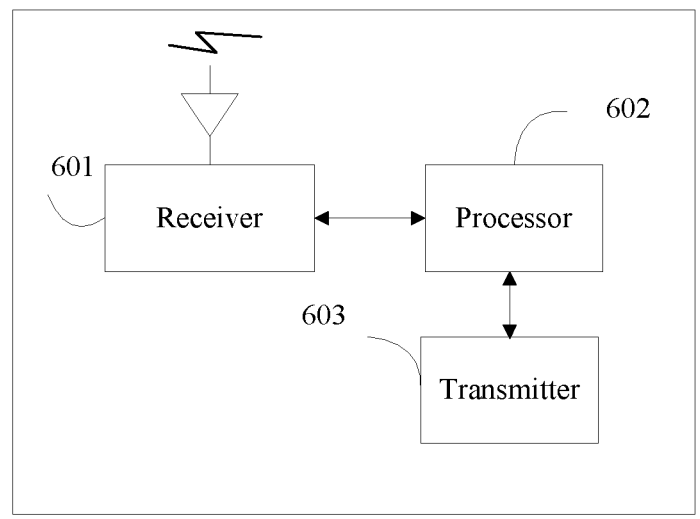
FIG. 6 is another possible schematic structural diagram of a terminal device according to an embodiment of the present disclosure.

FIG. 6 is another possible schematic structural diagram of a terminal device according to a first embodiment of the present disclosure.

The terminal device may include a receiver 601, a processor 602, and a transmitter 603, and depending on an actual requirement, may further include a memory 604, configured to store related data information.

The receiver 601 is configured to receive communications interface configuration information from a network-side device, where the communications interface configuration information includes interface indication information, and the interface indication information is used to indicate at least one communications interface used by the transmitter to send a V2X service message.

The processor 602 is configured to determine, based on the communications interface configuration information, one communications interface from at least two communications interfaces used to send a V2X service message.

The transmitter 603 is configured to send the V2X service message through the determined one communications interface.

In one embodiment, the at least two communications interfaces used to send a V2X service message include a PC5 interface and a Uu interface, and the interface indication information is used to indicate at least one of the PC5 interface and the Uu interface.

In one embodiment, the interface indication information is indication information of a first communications interface, and the first communications interface is the PC5 interface or the Uu interface. The processor 602 determines the first communications interface. The transmitter 603 sends the V2X service message through the first communications interface.

In one embodiment, the interface indication information indicates at least one communications interface, the at least one communications interface includes the PC5 interface and the Uu interface, and the communications interface configuration information further includes a communications interface trigger condition for determining the PC5 interface or the Uu interface. The processor 602 is configured to determine one of the PC5 interface and the Uu interface as a communications interface when determining that the communications interface trigger condition is met.

In another embodiment, the processor 602 is further configured to: if determining that a communications interface currently used by the V2X service message is a communications interface different from the determined one communications interface, stop the transmitter 603 from sending the V2X service message through the currently used communications interface; and the transmitter is configured to send the V2X service message through the determined one communications interface.

In still another embodiment, the processor 602 configures a logical channel and a protocol stack based on the determined one communications interface, and the transmitter 603 sends the V2X service message on the configured logical channel.

It should be noted that, for specific implementations of receiving, by the terminal device, the communications interface configuration information, configuring the communications interface, and sending the V2X service message, reference may be made to the method descriptions in the first embodiment of the present disclosure. The terminal device in this embodiment and the method in the first embodiment of the present disclosure corresponding to FIG. 3 are based on a same concept. A technical effect brought by the terminal device is the same as that of the first embodiment of the present disclosure. Specific functions of the receiver 601, the processor 602, and the transmitter 603 that are included in the terminal device in this embodiment, and terms and implementation details thereof are corresponding to the functions in the embodiment corresponding to FIG. 3. For specific content, refer to the descriptions in the method embodiment corresponding to FIG. 3 in the present disclosure. Details are not described herein again.

Figure 7:
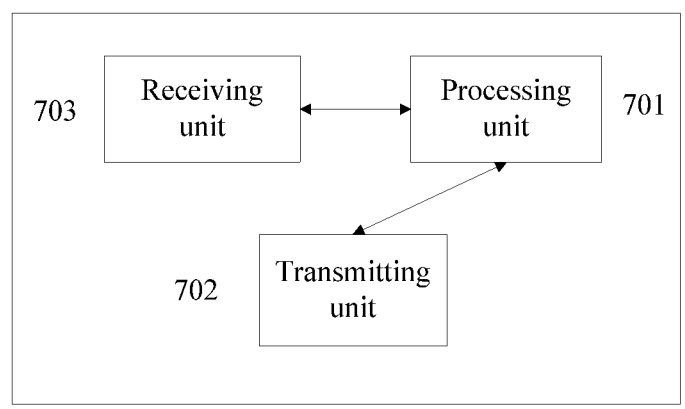
FIG. 7 is a possible schematic structural diagram of a network-side device according to an embodiment of the present disclosure.

FIG. 7 is a possible schematic structural diagram of a network-side device according to a first embodiment of the present disclosure.

The network-side device includes a processing unit 701, a transmitting unit 702, and a receiving unit 703, and in addition, may further include a storage unit 704.

The processing unit 701 is configured to generate communications interface configuration information, where the communications interface configuration information includes interface indication information, and the interface indication information is used to indicate at least one communications interface used by a terminal device to send a V2X service message.

The transmitting unit 702 is configured to send the communications interface configuration information, where the communications interface configuration information is used by the terminal device to determine one communications interface from at least two communications interfaces used to send a V2X service message, and the determined one communications interface is used by the terminal device to send the V2X service message.

In one embodiment, the at least two communications interfaces used to send a V2X service message include a PC5 interface and a Uu interface, and the interface indication information is used to indicate at least one of the PC5 interface and the Uu interface.

In one embodiment, the interface indication information is indication information of a first communications interface, the first communications interface is the PC5 interface or the Uu interface, and the first communications interface is used by the terminal device to send the V2X service message.

In one embodiment, the interface indication information indicates at least one communications interface, the at least one communications interface includes the PC5 interface and the Uu interface, the communications interface configuration information further includes a communications interface trigger condition for determining the PC5 interface or the Uu interface, and the communications interface trigger condition is used by the terminal device to determine one of the PC5 interface and the Uu interface as a communications interface.

For example, the communications interface trigger condition includes one or more of the following conditions:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message CAM or a basic safety message BSM; and a link between the terminal device and the network-side device encounters an exception, where the exception includes at least one of a radio link failure RLF, a handover failure HOF, or out of coverage OoC.

For another example, the communications interface trigger condition includes one or more of the following conditions:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message DENM or an Internet of Vehicles data Telematics message.

It should be noted that, for a specific implementation of processing the communications interface configuration information by the network-side device, reference may be made to the method descriptions in the first embodiment of the present disclosure. The network-side device in this embodiment and the method corresponding to the network-side device side in the first embodiment of the present disclosure corresponding to FIG. 3 are based on a same concept. A technical effect brought by the network-side device is the same as that of the first embodiment of the present disclosure. Specific functions of the processing unit 701, the transmitting unit 702, and the receiving unit 703 that are included in the network-side device in this embodiment, and terms and implementation details thereof are corresponding to the functions in the embodiment corresponding to FIG. 3. For specific content, refer to the descriptions in the method embodiment corresponding to FIG. 3 in the present disclosure. Details are not described herein again.

Figure 8:
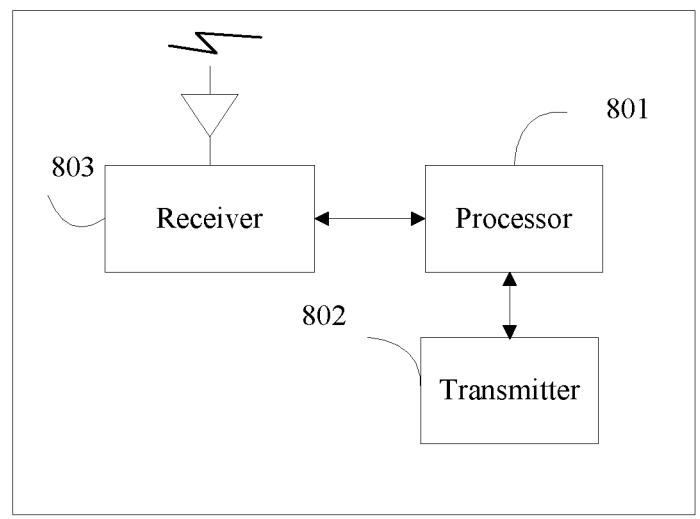
FIG. 8 is another possible schematic structural diagram of a network-side device according to an embodiment of the present disclosure.

FIG. 8 is another possible schematic structural diagram of a network-side device according to a first embodiment of the present disclosure.

The network-side device includes a processor 801, a transmitter 802, and a receiver 803, and in addition, may further include a storage unit (not shown in the figure).

The processor 801 is configured to generate communications interface configuration information, where the communications interface configuration information includes interface indication information, and the interface indication information is used to indicate at least one communications interface used by a terminal device to send a V2X service message.

The transmitter 802 is configured to send the communications interface configuration information, where the communications interface configuration information is used by the terminal device to determine one communications interface from at least two communications interfaces used to send a V2X service message, and the determined one communications interface is used by the terminal device to send the V2X service message.

In one embodiment, the at least two communications interfaces used to send a V2X service message include a PC5 interface and a Uu interface, and the interface indication information is used to indicate at least one of the PC5 interface and the Uu interface.

In one embodiment, the interface indication information is indication information of a first communications interface, the first communications interface is the PC5 interface or the Uu interface, and the first communications interface is used by the terminal device to send the V2X service message.

In one embodiment, the interface indication information indicates at least one communications interface, the at least one communications interface includes the PC5 interface and the Uu interface, the communications interface configuration information further includes a communications interface trigger condition for determining the PC5 interface or the Uu interface, and the communications interface trigger condition is used by the terminal device to determine one of the PC5 interface and the Uu interface as a communications interface.

For example, the communications interface trigger condition includes one or more of the following conditions:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a cooperative awareness message CAM or a basic safety message BSM; and a link between the terminal device and the network-side device encounters an exception, where the exception includes at least one of a radio link failure RLF, a handover failure HOF, or out of coverage OoC.

For another example, the communications interface trigger condition includes one or more of the following conditions:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a decentralized environmental notification message DENM or an Internet of Vehicles data Telematics message.

It should be noted that, for a specific implementation of processing the communications interface configuration information by the network-side device, reference may be made to the method descriptions in the first embodiment of the present disclosure. The network-side device in this embodiment and the method corresponding to the network-side device side in the first embodiment of the present disclosure corresponding to FIG. 3 are based on a same concept. A technical effect brought by the network-side device is the same as that of the first embodiment of the present disclosure. Specific functions of the processor 801, the transmitter 802, and the receiver 803 that are included in the network-side device in this embodiment, and terms and implementation details thereof are corresponding to the functions in the embodiment corresponding to FIG. 3. For specific content, refer to the descriptions in the method embodiment corresponding to FIG. 3 in the present disclosure. Details are not described herein again.

To implement the technical solution in the second embodiment of the present disclosure, the present disclosure provides a possible structure of a terminal device.

The terminal device may include a transmitting unit, a processing unit, and a receiving unit, and depending on a requirement, may further include a storage unit.

The transmitting unit is configured to send a V2X service message through a communications interface.

The processing unit is configured to detect a first communications interface currently used to send a V2X service message; determine a second communications interface; and if the first communications interface is different from the second communications interface, instruct the transmitting unit to: stop sending the V2X service message through the first communications interface, and send the V2X service message through the second communications interface, where the first or the second communications interface is determined from at least two communications interfaces used to send a V2X service message.

In one embodiment, the at least two communications interfaces used to send a V2X service message include a PC5 interface and a Uu interface; and the first communications interface is any one of the PC5 interface and the Uu interface, and the second communications interface is the other one of the PC5 interface and the Uu interface.

The processing unit is configured to obtain a dedicated logical channel corresponding to the first communications interface, and configure the dedicated logical channel corresponding to the first communications interface by using a dedicated logical channel and protocol stack communications interface reconfiguration information that are corresponding to the second communications interface, where each dedicated logical channel is uniquely identified by a channel label.

In one embodiment, the processing unit is further configured to: when determining that the second communications interface is the Uu interface, report one or more channel labels corresponding to the first communications interface, where the channel label is used to identify the dedicated logical channel corresponding to the first communications interface; and configure, based on the communications interface reconfiguration information, the dedicated logical channel identified by the channel label, and generate the dedicated logical channel corresponding to the second communications interface; and the receiving unit is configured to receive the communications interface reconfiguration information corresponding to the second communications interface.

In one embodiment, the processing unit is further configured to: when determining that the second communications interface is the PC5 interface, obtain one or more channel labels corresponding to the first communications interface, and generate the communications interface reconfiguration information corresponding to the second communications interface; and configure, based on the communications interface reconfiguration information, a dedicated logical channel identified by the channel label, and generate the dedicated logical channel corresponding to the second communications interface.

In another embodiment, the receiving unit is configured to receive communications interface configuration information, where the communications interface configuration information includes interface indication information, and the interface indication information is used to indicate at least one communications interface used by the transmitting unit to send a V2X service message.

In one embodiment, the processing unit is further configured to: if determining that the interface indication information indicates one communications interface, and the communications interface is the PC5 interface or the Uu interface, determine that the second communications interface is the one communications interface indicated by the interface indication information.

In one embodiment, the processing unit is further configured to: if determining that the interface indication information indicates at least one communications interface, and the at least one communications interface includes the PC5 interface and the Uu interface, determine the second communications interface depending on whether a communications interface trigger condition is met, where the second communications interface is one of the PC5 interface and the Uu interface, and the communications interface trigger condition is included in the communications interface configuration information.

For example, when determining that the communications interface trigger condition meets one or more of the following conditions, the processing unit determines that the second communications interface is the PC5 interface:
  radio environment measurement information corresponding to the PC5 interface is lower than a first threshold;
  radio environment measurement information corresponding to the Uu interface is lower than a second threshold;
  quality of communication currently performed by using the Uu interface does not meet a specific requirement;
  a type of a message to be transmitted is a CAM or a BSM; and
  a link between the terminal device and the network-side device encounters an exception, where the exception includes at least one of a radio link failure RLF, a handover failure HOF, or out of coverage OoC.

For another example, when determining that the communications interface trigger condition meets one or more of the following conditions, the processing unit determines that the second communications interface is the Uu interface:
  radio environment measurement information corresponding to the PC5 interface is higher than a first threshold;
  radio environment measurement information corresponding to the Uu interface is higher than a second threshold;
  quality of communication currently performed by using the PC5 interface does not meet a specific requirement; and
  a type of a message to be transmitted is a DENM or Internet of Vehicles data Telematics.

It should be noted that, for a specific implementation of switching between communications interfaces by the terminal device in a V2X service message sending process, refer to the method descriptions in the second embodiment of the present disclosure. The terminal device in this embodiment and the method in the second embodiment of the present disclosure corresponding to FIG. 4 are based on a same concept. A technical effect brought by the terminal device is the same as that of the second embodiment of the present disclosure. Specific functions of the receiving unit, the processing unit, and the transmitting unit that are included in the terminal device in this embodiment, and terms and implementation details thereof are corresponding to the functions in the embodiment corresponding to FIG. 4. For specific content, refer to the descriptions in the method embodiment corresponding to FIG. 4 in the present disclosure. Details are not described herein again.

To implement the technical solution in the second embodiment of the present disclosure, the present disclosure provides another possible structure of a terminal device.

The terminal device may include a transmitter, a processor, and a receiver, and depending on a requirement, may further include a memory.

The transmitter is configured to send a V2X service message through a communications interface.

The processor is configured to detect a first communications interface currently used to send a V2X service message; determine a second communications interface; and if the first communications interface is different from the second communications interface, instruct the transmitter to: stop sending the V2X service message through the first communications interface, and send the V2X service message through the second communications interface, where the first or the second communications interface is determined from at least two communications interfaces used to send a V2X service message.

In one embodiment, the at least two communications interfaces used to send a V2X service message include a PC5 interface and a Uu interface; and the first communications interface is any one of the PC5 interface and the Uu interface, and the second communications interface is the other one of the PC5 interface and the Uu interface.

The processor is configured to obtain a dedicated logical channel corresponding to the first communications interface, and configure the dedicated logical channel corresponding to the first communications interface by using a dedicated logical channel and protocol stack communications interface reconfiguration information that are corresponding to the second communications interface, where each dedicated logical channel is uniquely identified by a channel label.

In one embodiment, the processor is further configured to: when determining that the second communications interface is the Uu interface, report one or more channel labels corresponding to the first communications interface, where the channel label is used to identify the dedicated logical channel corresponding to the first communications interface; and configure, based on the communications interface reconfiguration information, the dedicated logical channel identified by the channel label, and generate the dedicated logical channel corresponding to the second communications interface; and the receiver is configured to receive the communications interface reconfiguration information corresponding to the second communications interface.

In one embodiment, the processor is further configured to: when determining that the second communications interface is the PC5 interface, obtain one or more channel labels corresponding to the first communications interface, and generate the communications interface reconfiguration information corresponding to the second communications interface; and configure, based on the communications interface reconfiguration information, a dedicated logical channel identified by the channel label, and generate the dedicated logical channel corresponding to the second communications interface.

In another embodiment, the receiver is configured to receive communications interface configuration information, where the communications interface configuration information includes interface indication information, and the interface indication information is used to indicate at least one communications interface used by the transmitter to send a V2X service message.

In one embodiment, the processor is further configured to: if determining that the interface indication information indicates one communications interface, and the communications interface is the PC5 interface or the Uu interface, determine that the second communications interface is the one communications interface indicated by the interface indication information.

In one embodiment, the processor is further configured to: if determining that the interface indication information indicates at least one communications interface, and the at least one communications interface includes the PC5 interface and the Uu interface, determine the second communications interface depending on whether a communications interface trigger condition is met, where the second communications interface is one of the PC5 interface and the Uu interface, and the communications interface trigger condition is included in the communications interface configuration information.

For example, when determining that the communications interface trigger condition meets one or more of the following conditions, the processor determines that the second communications interface is the PC5 interface:

radio environment measurement information corresponding to the PC5 interface is lower than a first threshold;

radio environment measurement information corresponding to the Uu interface is lower than a second threshold;

quality of communication currently performed by using the Uu interface does not meet a specific requirement;

a type of a message to be transmitted is a CAM or a BSM; and a link between the terminal device and the network-side device encounters an exception, where the exception includes at least one of a radio link failure RLF, a handover failure HOF, or out of coverage OoC.

For another example, when determining that the communications interface trigger condition meets one or more of the following conditions, the processor determines that the second communications interface is the Uu interface:

radio environment measurement information corresponding to the PC5 interface is higher than a first threshold;

radio environment measurement information corresponding to the Uu interface is higher than a second threshold;

quality of communication currently performed by using the PC5 interface does not meet a specific requirement; and a type of a message to be transmitted is a DENM or Internet of Vehicles data Telematics.

It should be noted that, for a specific implementation of switching between communications interfaces by the terminal device in a V2X service message sending process, refer to the method descriptions in the second embodiment of the present disclosure. Specific functions of the receiver, the processor, and the transmitter that are included in the terminal device in this embodiment, and terms and implementation details thereof are corresponding to the functions in the embodiment corresponding to FIG. 4. For specific content, refer to the descriptions in the method embodiment corresponding to FIG. 4 in the present disclosure. Details are not described herein again.

It should be understood that "one embodiment", "an embodiment", or "an embodiment of the present disclosure" mentioned throughout the specification means that particular features, structures, or characteristics related to the embodiment are included in at least one embodiment of the present disclosure. Therefore, "in one embodiment", "in an embodiment", or "in an embodiment of the present disclosure" that appears throughout the specification does not necessarily mean a same embodiment. Moreover, the particular features, structures, or characteristics may be combined in one or more embodiments in any proper manner.

It should be understood that sequence numbers of the foregoing processes do not mean execution sequences in various embodiments of the present disclosure. The execution sequences of the processes should be determined based on functions and internal logic of the processes, and should not be construed as any limitation on the implementation processes of the embodiments of the present disclosure.

A person of ordinary skill in the art may be aware that the units and steps in the examples described with reference to the embodiments disclosed herein may be implemented by electronic hardware, computer software, or a combination thereof. To clearly describe interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The foregoing descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A vehicle to everything (V2X) service message sending method, comprising:

receiving, by a terminal device, communications interface configuration information from a network-side device, wherein the communications interface configuration information comprises interface indication information to indicate at least one communications interface used to send a V2X service message and a communications interface trigger condition to trigger when the at least one communications interface is to be used;

determining, by the terminal device based on the communications interface configuration information, a communications interface from at least two communications interfaces used to send a V2X service message; and sending, by the terminal device, the V2X service message through the determined communications interface.

2. The method according to claim 1, wherein
the at least two communications interfaces used to send a V2X service message comprise a PC5 interface and a Uu interface, and the interface indication information is used to indicate at least one of the PC5 interface and the Uu interface.

3. The method according to claim 2, wherein
the interface indication information indicates a first communications interface, and the first communications interface is the PC5 interface or the Uu interface; and wherein the determining, by the terminal device based on the communications interface configuration information, a communications interface from at least two communications interfaces used to send a V2X service message comprises:

determining, by the terminal device, the first communications interface to send the V2X service message.

4. The method according to claim 2, wherein
the interface indication information indicates at least one communications interface having the PC5 interface and the Uu interface, and the communications interface configuration information further comprises the communications interface trigger condition for determining the PC5 interface or the Uu interface; and wherein the determining, by the terminal device based on the communications interface configuration information, a communications interface from at least two communications interfaces used to send a V2X service message comprises:

determining, by the terminal device, one of the PC5 interface and the Uu interface as the communications interface when determining that the communications interface trigger condition is met.

5. The method according to claim 4, wherein
the determining, by the terminal device, one of the PC5 interface and the Uu interface as a communications interface when determining that the communications interface trigger condition is met comprises:

determining, by the terminal device, the PC5 interface as the communications interface when determining that one or more of the following conditions are met:
radio environment measurement information corresponding to the PC5 interface is lower than a first threshold;
radio environment measurement information corresponding to the Uu interface is lower than a second threshold;
quality of communication currently performed by using the Uu interface does not meet a specific requirement;
a message to be transmitted is a cooperative awareness message (CAM) or a basic safety message (BSM); and
a link exception between the terminal device and the network-side device occurs, wherein the link exception comprises at least one of a radio link failure (RLF), a handover failure (HOF), or out of coverage (OoC).

6. The method according to claim 4, wherein
the determining, by the terminal device, one of the PC5 interface and the Uu interface as a communications interface when determining that the communications interface trigger condition is met comprises:

determining, by the terminal device, the Uu interface as the communications interface when determining that one or more of the following conditions are met:
radio environment measurement information corresponding to the PC5 interface is higher than a first threshold;
radio environment measurement information corresponding to the Uu interface is higher than a second threshold;
quality of communication currently performed by using the PC5 interface does not meet a specific requirement; and
a message to be transmitted is a decentralized environmental notification message (DENM) or an Internet of Vehicles data Telematics message.

7. A vehicle to everything (V2X) service message sending method, comprising:
generating, by a network-side device, communications interface configuration information, wherein the communications interface configuration information comprises interface indication information to indicate at least one communications interface used by a terminal device to send a V2X service message and a communications interface trigger condition to trigger when the at least one communications interface is to be used; and sending, by the network-side device, the communications interface configuration information, wherein the communications interface configuration information is used by the terminal device to determine a communications interface from at least two communications interfaces used to send a V2X service message, and the determined communications interface is used by the terminal device to send the V2X service message.

8. The method according to claim 7, wherein
the at least two communications interfaces used to send a V2X service message comprise a PC5 interface and a Uu interface, and the interface indication information is used to indicate at least one of the PC5 interface and the Uu interface.

9. The method according to claim 7, wherein
the interface indication information indicates a first communications interface, the first communications interface is a PC5 interface or a Uu interface, and the first communications interface is used by the terminal device to send the V2X service message.

10. The method according to claim 7, wherein
the interface indication information indicates at least one communications interface having a PC5 interface and a Uu interface, and the communications interface configuration information further comprises the communications interface trigger condition for determining the PC5 interface or the Uu interface; and
the communications interface trigger condition is used by the terminal device to determine one of the PC5 interface and the Uu interface as a communications interface.

11. The method according to claim 10, wherein
the communications interface trigger condition comprises one or more of the following conditions:
radio environment measurement information corresponding to the PC5 interface is lower than a first threshold;
radio environment measurement information corresponding to the Uu interface is lower than a second threshold;
quality of communication currently performed by using the Uu interface does not meet a specific requirement;
a message to be transmitted is a cooperative awareness message (CAM) or a basic safety message (BSM); and a link exception between the terminal device and the network-side device occurs, wherein the link exception comprises at least one of a radio link failure (RLF), a handover failure (HOF), or out of coverage (OoC).

12. The method according to claim 10, wherein
the communications interface trigger condition comprises one or more of the following conditions:
radio environment measurement information corresponding to the PC5 interface is higher than a first threshold;
radio environment measurement information corresponding to the Uu interface is higher than a second threshold;
quality of communication currently performed by using the PC5 interface does not meet a specific requirement; and
a message to be transmitted is a decentralized environmental notification message (DENM) or an Internet of Vehicles data Telematics message.

13. An apparatus, comprising:
a receiver, configured to receive communications interface configuration information from a network-side device, wherein the communications interface configuration information comprises interface indication information, and the interface indication information is used to indicate at least one communications interface used by a transmitter to send a vehicle to everything (V2X) service message and a communications interface trigger condition to trigger when the at least one communications interface is to be used;
a processor, configured to determine, based on the communications interface configuration information, a communications interface from at least two communications interfaces used to send a V2X service message; and
the transmitter, configured to send the V2X service message through the determined communications interface.

14. The apparatus according to claim 13, wherein
the at least two communications interfaces used to send a V2X service message comprise a PC5 interface and a Uu interface, and the interface indication information is used to indicate at least one of the PC5 interface and the Uu interface.

15. The apparatus according to claim 14, wherein
the interface indication information indicates a first communications interface, and the first communications interface is the PC5 interface or the Uu interface;
the processor determines the first communications interface; and
the transmitter sends the V2X service message through the first communications interface.

16. The apparatus according to claim 14, wherein
the interface indication information indicates at least one communications interface, the at least one communications interface comprises the PC5 interface and the Uu interface, and the communications interface configuration information further comprises the communications interface trigger condition for determining the PC5 interface or the Uu interface; and
the processor is configured to determine one of the PC5 interface and the Uu interface as a communications interface when determining that the communications interface trigger condition is met.

17. The apparatus according to claim 16, wherein
the processor is further configured to determine the PC5 interface as the communications interface when determining that one or more of the following communications interface trigger conditions are met:
radio environment measurement information corresponding to the PC5 interface is lower than a first threshold;
radio environment measurement information corresponding to the Uu interface is lower than a second threshold;
quality of communication currently performed by using the Uu interface does not meet a specific requirement;
a type of a message to be transmitted is a cooperative awareness message (CAM) or a basic safety message (BSM); and
a link exception between the terminal device and the network-side device occurs, wherein the link exception comprises at least one of a radio link failure (RLF), a handover failure (HOF), or out of coverage (OoC).

18. The apparatus according to claim 16, wherein
the processor is further configured to determine the Uu interface as the communications interface when determining that one or more of the following communications interface trigger conditions are met:
radio environment measurement information corresponding to the PC5 interface is higher than a first threshold;
radio environment measurement information corresponding to the Uu interface is higher than a second threshold;
quality of communication currently performed by using the PC5 interface does not meet a specific requirement; and
a message to be transmitted is a decentralized environmental notification message (DENM) or an Internet of Vehicles data Telematics message.

19. The apparatus according to claim 13, wherein
the communications interface configuration information is carried in system information or a radio resource control (RRC) dedicated message.

20. The apparatus according to claim 13, wherein
the processor is configured to: if determining that a communications interface currently used by the V2X service message is a communications interface different from the determined communications interface, stop the transmitter from sending the V2X service message through the currently used communications interface; and
the transmitter is configured to send the V2X service message through the determined one communications interface.

* * * * *